United States Patent
Ayirala et al.

(10) Patent No.: US 11,867,039 B2
(45) Date of Patent: Jan. 9, 2024

(54) ALTERNATING MICROSPHERE AND SMARTWATER INJECTION FOR ENHANCED OIL RECOVERY

(71) Applicant: Saudi Arabian Oil Company, Dhahran (SA)

(72) Inventors: Subhash Chandrabose Ayirala, Dhahran (SA); Dongqing Cao, Beijing (CN); Ming Han, Dhahran (SA); Saleh Hamad Al-Salah, Dhahran (SA); Ali Yousef, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/571,257

(22) Filed: Jan. 7, 2022

(65) Prior Publication Data
US 2023/0220754 A1    Jul. 13, 2023

(51) Int. Cl.
*E21B 43/20* (2006.01)
*C09K 8/588* (2006.01)
*E21B 43/16* (2006.01)

(52) U.S. Cl.
CPC .............. *E21B 43/20* (2013.01); *C09K 8/588* (2013.01); *E21B 43/162* (2013.01)

(58) Field of Classification Search
CPC ........ E21B 43/20; E21B 43/162; C09K 8/588
See application file for complete search history.

(56) References Cited

U.S. PATENT DOCUMENTS

| | | | |
|---|---|---|---|
| 5,735,349 A | 4/1998 | Dawson et al. | |
| 8,550,164 B2 | 10/2013 | Al-Yousef et al. | |
| 10,000,687 B2 * | 6/2018 | Al-Yousef | C09K 8/80 |
| 2010/0038086 A1 * | 2/2010 | Bunnell | C09K 8/80 166/308.2 |
| 2012/0018161 A1 * | 1/2012 | Al-Yousef | C09K 8/58 166/305.1 |
| 2015/0233223 A1 | 8/2015 | AlAmeri et al. | |
| 2017/0020432 A1 | 1/2017 | Ayrala et al. | |
| 2017/0204322 A1 * | 7/2017 | Ayirala | E21B 43/20 |
| 2019/0023974 A1 * | 1/2019 | Ayirala | C08K 3/00 |
| 2020/0140743 A1 | 5/2020 | O'Reilly et al. | |

FOREIGN PATENT DOCUMENTS

| | | | | |
|---|---|---|---|---|
| CN | 108350347 A | * | 7/2018 | ............... C09K 8/50 |
| WO | WO-2018031655 A1 | * | 2/2018 | |
| WO | WO 2019025810 | | 2/2019 | |

OTHER PUBLICATIONS

Alhuraishawy et al., "Conformance Control Improvement by Coupling Microgel and Low Salinity Waterflooding in Fractured Reservoirs," SPE Middle East Oil and Gas Show and Conference, Mar. 2019, 17 pages.

(Continued)

*Primary Examiner* — Silvana C Runyan
(74) *Attorney, Agent, or Firm* — Fish & Richardson P.C.

(57) ABSTRACT

A method for enhanced oil recovery in a reservoir is provided. The method includes injecting a microsphere suspension, including polymeric microspheres dispersed in seawater, into an injection well in the reservoir and injecting a low salinity tailored water (SmartWater) into the injection well in the reservoir. Oil is produced from a production well in the reservoir.

15 Claims, 6 Drawing Sheets

(56) References Cited

OTHER PUBLICATIONS

Hou et al., "Field Application of Nanoscale Polymer Microspheres for In-Depth Profile Control in the Ultralow Permeability Oil Reservoir," Frontiers in Chemistry, Oct. 2020, 8(805):1-13, 13 pages.

Hua et al., "Study on Plugging Performance of Cross-linked Polymer Microspheres with Reservoir Pores," Journal of Petroleum Science and Engineering, 2013, 105:70-75, 6 page.

Sarvestani et al., "Smart water flooding performance in carbonate reservoirs: an experimental approach for tertiary oil recovery," Journal of Petroleum Exploration and Production Technology, Apr. 2019, 9:2643-2657, 15 pages.

Yao et al., "Transport and Retention Behaviors of Deformable Polyacrylamide Microspheres in Convergent-Divergent Microchannels," Environmental Science & Technology, Jul. 2020, 54(17):10876-10884, 9 pages.

Yuqin et al., "Research and Application of Nano Polymer Microspheres Diversion Technique of Deep Fluid," SPE International Oilfield Nanotechnology Conference and Exhibition, Jun. 2012, 6 pages.

Mahon et al., "Swelling performance of sodium polyacrylate and poly(acrylamide-co-acrylic acid) potassium salt," SN Applied Sciences, 2020, 15 pages.

PCT International Search Report and Written Opinion in International Appln. No. PCT/US2023/010317, dated Apr. 28, 2023, 16 pages.

* cited by examiner

200

ALTERNATING MICROSPHERE AND SMARTWATER INJECTION FOR ENHANCED OIL RECOVERY

TECHNICAL FIELD

The present disclosure is directed to enhanced oil recovery through the alternate injection of microspheres and an ionic tailored water (SmartWater).

BACKGROUND

Enhanced oil recovery (EOR) is the use of techniques to extract crude oil from reservoirs that may otherwise not be recoverable. Any number of techniques may be used, including water injection, carbon dioxide injection, chemical injection, foam injection, and heating of the reservoir, for example, by steam injection. In many cases, the injection may be performed by recycling produced materials, such as gas, water, or both, back into the well.

Accordingly, a large number of oil reservoirs are treated by water flooding EOR techniques to displace oil from injection wells to production wells. However, water flooding can be inefficient, depending on the type of water used, such as seawater.

SUMMARY

An embodiment described in examples herein provides a method for enhanced oil recovery in a reservoir. The method includes injecting a microsphere suspension, including polymeric microspheres dispersed in seawater, into an injection well in the reservoir and injecting a low salinity tailored water (SmartWater) into the injection well in the reservoir. Oil is produced from a production well in the reservoir.

DETAILED DESCRIPTION

Figure 1:
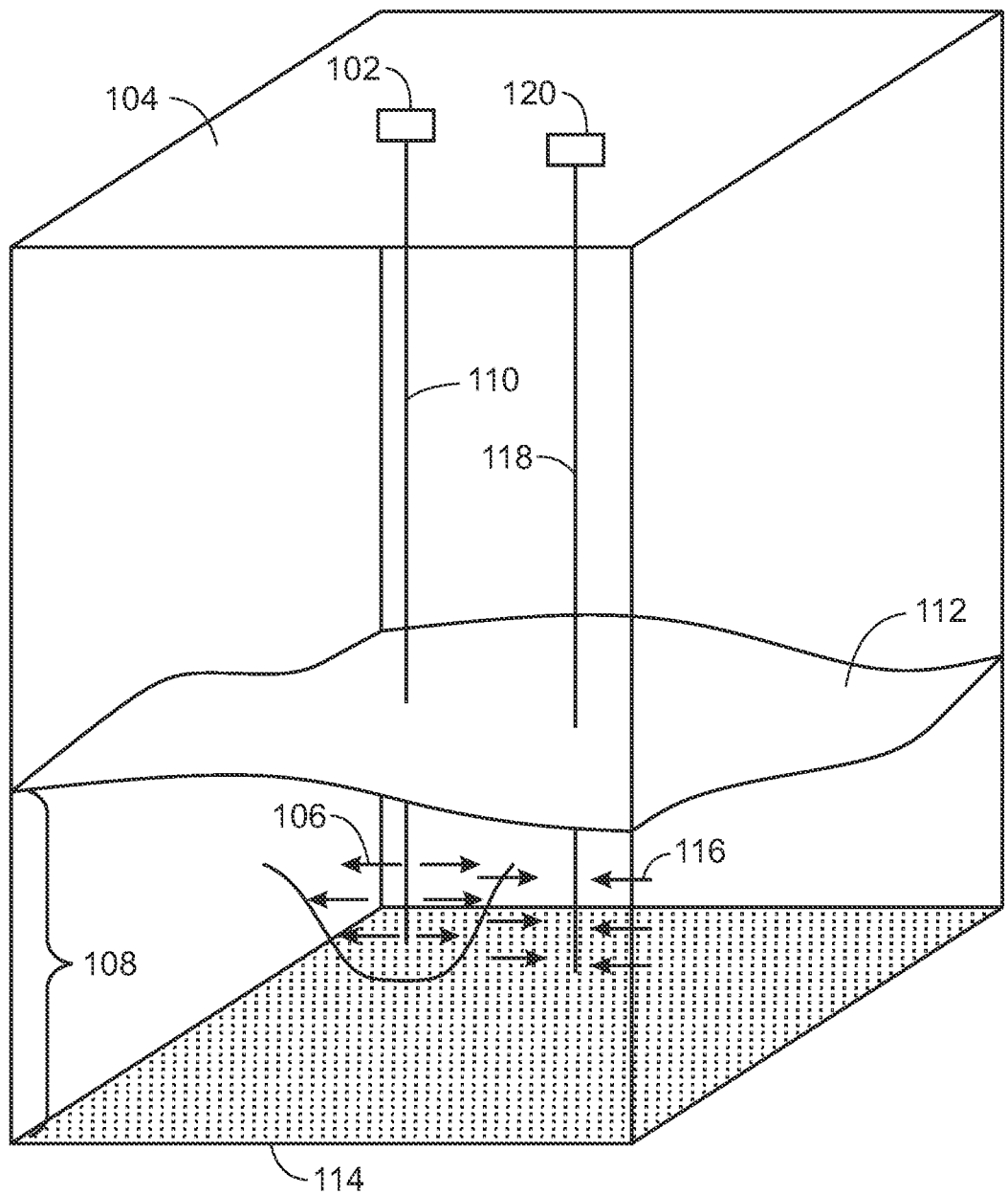
FIG. 1 is a schematic diagram of an enhanced oil recovery process.

Examples described herein provide improved techniques for water flooding for EOR. The techniques may decrease the amount of oil lost due to high-porosity in reservoirs, such as carbonate reservoirs. In the techniques, a sequential injection of a slug of microspheres dispersed in seawater is followed by low salinity tailored water, termed Smart water herein. This combination may effectively mobilize remaining oil in the reservoir and push the oil towards production wells by blocking pores that the oil may flow through away from the production well.

As used herein, a microsphere is a pre-formed crosslinked polymer particle that can swell or shrink depending on the salinity of aqueous environment. The polymer particle is produced using emulsion polymerization, which provides control over the size and shape. For example, in some embodiments the microspheres range in size from about 10 nm to about 10 μm before swelling.

Generally, the microspheres shrink in high salinity water, such as seawater, while swelling in low salinity tailored water. After the microspheres are dispersed in seawater, they are easily injected due to the small size. The subsequent injection of the SmartWater, either as a finite slug or as a continuous chase water, swells the microspheres in the reservoir, which blocks the high permeability channels. The blockage diverts the flow of the SmartWater into unswept regions to mobilize oil. Thus, the injection of the microsphere in high salinity seawater followed by the injection of SmartWater increases the sweep efficiency in the reservoir, leading to improved oil recovery. Ranges of particle sizes for the microspheres, the concentration of the microspheres in the seawater, and sizes of the slugs of microspheres in seawater and SmartWater are optimized to achieve the good performance in variety of carbonate oil reservoirs.

For example, the particle size of the microsphere made by emulsion polymerization can be tightly controlled in ranges between 10 nm to 10 μm. In various embodiments, the particle sizes of the microspheres can be between about 10 nm and about 100 nm, or between about 100 nm and about 500 nm, or between about 500 nm and about 1 μm, or between about 1 μm and 5 μm, or between 5 μm and 10 μm. Multiple ranges can be used depending on the pore sizes of the reservoir.

In some embodiments, the concentration of the microspheres in the seawater is between about 0.1 wt. % and about 0.5 wt. %, or between about 0.15 wt. % and about 0.35 wt. %. In one embodiment, the concentration of the microspheres is about 0.2 wt. %.

In some embodiments, the slug size is between about 0.05 pore volumes (PV), and about 1.0 PV.

Following the injection of the SmartWater with a further injection of seawater, with or without microspheres, can shrink or mobilize the microspheres allowing them to flow deeper into the reservoir. A subsequent injection of the SmartWater may result in the microspheres swelling again, blocking pores in different locations. Accordingly, alternating injections of microspheres and SmartWater can be used to further increase the production from the reservoir.

However, the synergy between microsphere and SmartWater cannot be fully simulated by the simple injection of microspheres with SmartWater. When injected into the reservoir, the microspheres may have both blocking capacity for effective fluid diversion and injectivity capacity for in-depth transport. However, SmartWater with lower ion content than the conventional injection water can also increase the stability of the SmartWater suspension by making the particles more repellent. This prevents the aggregation of the microspheres and improves the ability of the microspheres to be injected through smaller pores. In contrast to this effect, SmartWater may swell the microspheres to larger sizes, as the microspheres are a water swollen polymeric material. This increases the blocking performance in the reservoir. While the two effects seem to be mutually conflicting, the sequential injection of the microspheres and the SmartWater takes advantage of both affects, allowing improved injectivity in the seawater suspension, while swelling in the SmartWater to block pores.

FIG. 1 is a schematic diagram of an enhanced oil recovery process 100. As shown in FIG. 1, an apparatus 102 at the surface 104 is used to inject fluids 106 into a reservoir 108 through an injection well 110. The reservoir 108 is formed by a cap rock layer 112 that traps oil underneath the cap rock layer 112. A lower layer 114, such as an aquifer, may form the bottom of the reservoir 108.

The fluids 106 push oil 116 away from the injection well 110 and towards a production well 118. The oil 116 is then produced to a surface apparatus 120 through the production well 118.

As described herein, in various embodiments, the fluids 106 include alternating slugs of a suspension of microspheres in seawater and SmartWater. The swelling of the microspheres in the SmartWater plugs channels in the reservoir 108, forcing flow, for example, of the SmartWater to take different paths through the reservoir 108, and increase the amount of oil 116 produced.

Figure 2:
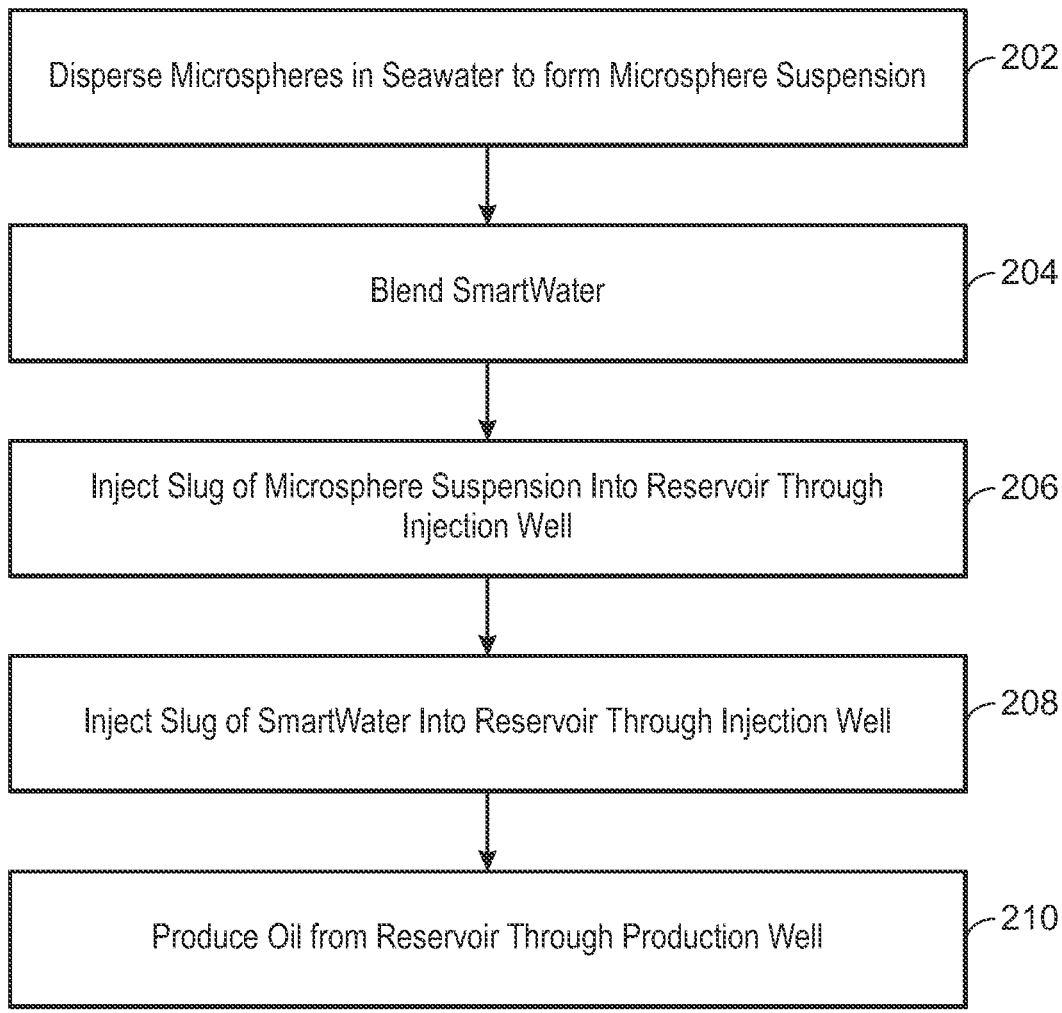
FIG. 2 is a process flow diagram of a method for improving enhanced oil recovery with a sequential injection of a microsphere suspension and a water with a tailored concentration of ions, termed SmartWater.

FIG. 2 is a process flow diagram of a method 200 for improving enhanced oil recovery with a sequential injection of a microsphere suspension and SmartWater. In the method 200, at block 202 the microspheres are suspended in the high salinity conventional injection water (seawater).

As used herein, a microsphere is a crosslinked polyacrylamide-based preformed gel with uniform sphere shape. The microspheres can be purchased as a powder or as an emulsion form before dispersing in water to form the microspheres suspension. The microspheres are available from oilfield chemical manufacturers in China, such as Henan Zhengjia Green Energy Co., Ltd.

The initial particle sizes of the microspheres ranges from about 10 nm to about 10 μm. After dispersion, the active concentration of microsphere in seawater ranges from 0.2 wt. % to about 0.5 wt. %. In some embodiments, the microspheres can be dispersed at a concentration of about 0.1 wt. % to about 0.3 wt. % in the seawater solution. The salinity of the seawater ranges from about 35,000 ppm to about 56,700 ppm total dissolved solids (TDS). This may be measured and controlled by adding additional water to dilute the seawater to control the ionic concentration, setting the initial particle size in the microsphere suspension.

At block 204, the SmartWater is blended. This is performed by adding ionic compounds at target concentrations to a base solution. In various embodiments, the base solution may be deionized water to which the various ions are added. In other embodiments, the base solution may be seawater or brine that is first diluted, and then used to dissolve ions to achieve the target concentrations. In various embodiments, the SmartWater salinity ranges from 4,000 to 8,000 ppm TDS with sulfate ions ranging from 300 to 1000 ppm and divalent calcium and magnesium ions less than 300 ppm.

At block 206, a slug of the microsphere suspension is injected into the reservoir through an injection well. In an embodiment, the reservoir is a permeable matrix type carbonate reservoir. As used herein, a slug is a volume of fluid that is injected into a reservoir. In some embodiments, the size of the slug of the microsphere suspension is between about 0.05 to about 1.00 pore volume. The pore volume (PV) is the amount of open space in pores in the reservoir, for example, accessible to the slug. The PV is often related to the total amount of oil in the reservoir. The microspheres in the slug will selectively invade the high permeability zones, for example, having low flow resistance. Because of the high salinity, the size of the microspheres will be small enough to be flowed into flow channels made up of smaller pores. Due to size and aggregation of the microspheres, there will be some retention in the pores, which will block part of the flow channels and produce a differential pressure increase. As a result, the injection water will be diverted to un-swept zones, allowing the deposition of microspheres in other pores.

At block 208, a slug of the SmartWater is injected into the reservoir through the injection well. The SmartWater will contact microspheres and microsphere aggregations trapped in the flow channels of the reservoir. Due to the lower salinity of the SmartWater, the microspheres will swell to a larger size and increase the blocking of the flow channels in the reservoir.

At block 210, oil is produced from the reservoir. This may use pumps or other surface or down-hole equipment to boost the oil up to the surface.

Further, the SmartWater will mix with the free microspheres at the interface with the seawater, for example, by dispersion and diffusion, forming a transition zone between the two slugs. The microspheres at the interface will then swell due to the decrease of salinity, producing more blocking of the flow channels. These will result in a further pressure increase. As a result, the SmartWater will be diverted into the un-swept area and displace the remaining oil more efficiently.

After swelling in the SmartWater, the microspheres are soft and deformable. With the increase of the differential pressure due to the blocking, the trapped microspheres may become movable due to the deformation. Further, the SmartWater increases the electrical potential and suspension stability of the microspheres after sufficient mixing. The microspheres with improved suspension stability will migrate more easily. These effects will enable the microspheres to be transported to the deep reservoir rather than near the wellbore, resulting in an improved injectivity.

Thus, at depth, the SmartWater is diverted to more zones. As the microspheres are made from chemical stable materials, they have no negative effect on the interactions between the SmartWater, rock, and crude oil. This allows the SmartWater to work as a normal water-flooding agent and produce more oil in the un-swept area.

Figure 3:
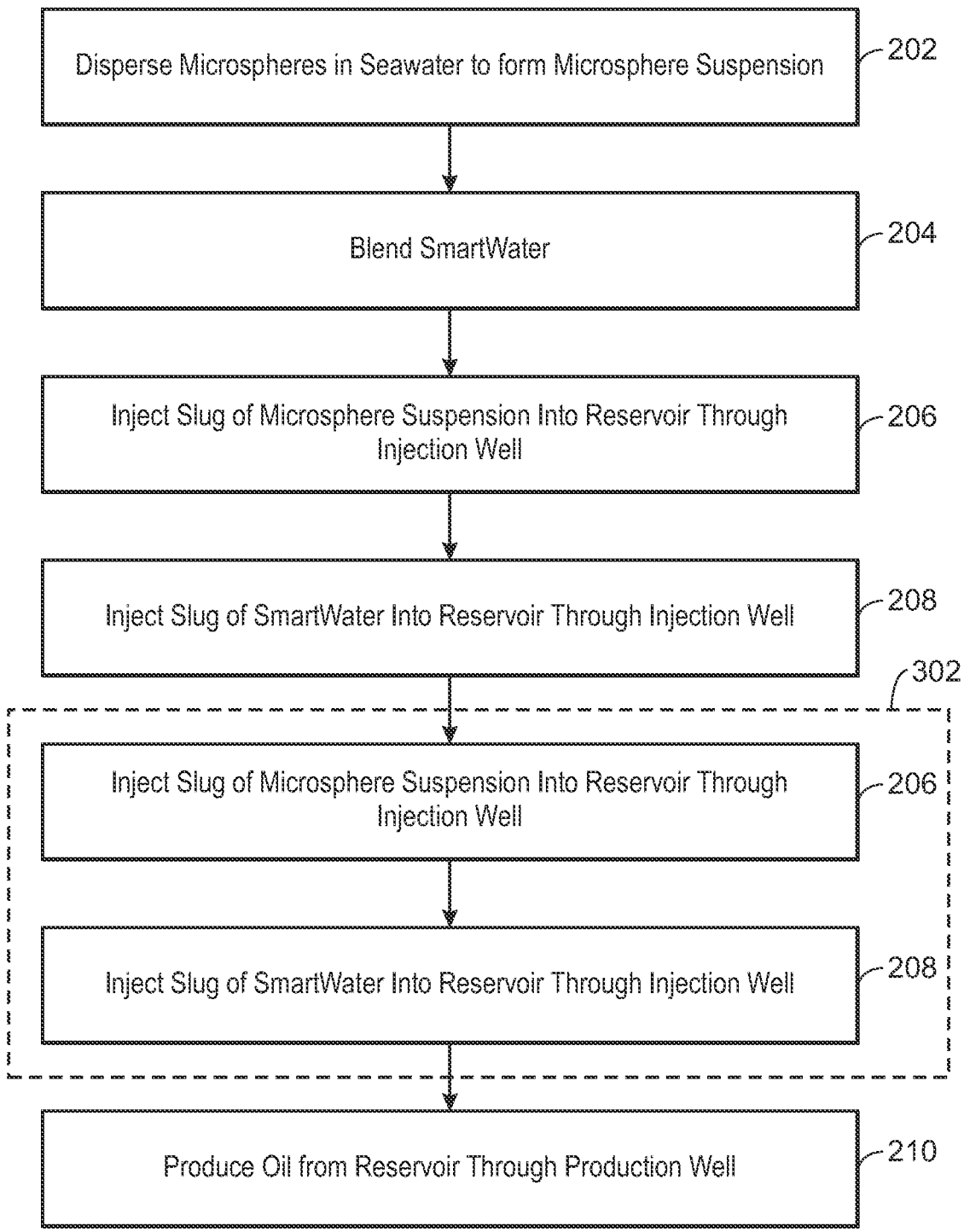
FIG. 3 is a process flow diagram of a method for improving enhanced oil recovery with multiple sequential injections of a microsphere suspension and SmartWater.

FIG. 3 is a process flow diagram of a method 300 for performing multiple iterations of the injections. Like numbered items are as described with respect to FIG. 2 In some embodiments, after one sequential injection of a slug of the microsphere suspension and a slug of the SmartWater, as shown in block 206 and block 208, the process may be iterated with alternating injections of the microsphere suspension and the SmartWater, as indicated by block 302. This results in increased contact and mixing between the two fluids. For example, two or three, or more, further iterations may be used for a total of four to six slugs, or more. As a result, the injectivity of the microspheres is further improved with little cost of blocking capacity. In some embodiments, an injection of seawater without microspheres is performed after the SmartWater injection to partially shrink the microspheres to allow them to be placed in two different flow channels.

EXAMPLES

To test the proposed method, an injection into a core sample of a microsphere suspension in high salinity seawater is alternated with an injection of a low salinity tailored water (SmartWater). The injectivity of microspheres in the core is improved with the desired blocking performance. The method was tested as described in the examples below. In Example 1, one iteration of the sequential injection of a microsphere suspension and SmartWater was injected into a carbonate core. In Example 2, two sequential injections of the injection of the microsphere suspension and the SmartWater were tested. In Example 3, oil displacement tests were performed using sequential injection of the microsphere suspension and the SmartWater.

Experimental

The concentrations and conditions used for the tests are shown in Tables 1 to 3. The examples tested the flow performance of microsphere in seawater followed by SmartWater injection as listed in Table 1. The core plugs used in the tests were natural carbonate cores from a Saudi Arabian oil reservoir. The properties of the cores are listed in Table 2. The ion composition of seawater as the conventional injection water and SmartWater are shown in Table 3.

TABLE 1

Injection scenarios in the Examples

| Example No. | Injection slugs |
|---|---|
| 1 | 0.5% microsphere in seawater (1 PV) → SmartWater; Flow test |
| 2 | 0.5% microsphere in seawater (0.6 PV) → SmartWater (0.2 PV) → 0.5% microsphere in seawater (0.4 PV) → SmartWater; Flow test |
| 3 | 0.5% microsphere in seawater (1 PV) → SmartWater; Oil displacement test |

TABLE 2

Properties of the Core plugs information

| Core No. | Diameter, cm | Length, cm | Pore volume, mL | Brine perm., md | Original oil in core, mL | Test type |
|---|---|---|---|---|---|---|
| 44 | 3.814 | 4.23 | 11.54 | 605 | — | Microsphere flow tests |
| 27 | 3.810 | 3.81 | 9.45 | 850 | 7.92 | Oil displacement test |
| 98 | 3.808 | 3.97 | 10.382 | 746 | 8.29 | Oil displacement test |

TABLE 3

Composition of conventional injection water (seawater) and SmartWater

| Iron | $Na^+$, ppm | $Ca^{2+}$, ppm | $Mg^{2+}$, ppm | $Cl^-$, ppm | $HCO_3^-$, ppm | $SO_4^{2-}$, ppm | TDS, ppm |
|---|---|---|---|---|---|---|---|
| Seawater | 18,300 | 650 | 2,110 | 32,200 | 120 | 4,290 | 57,670 |
| SmartWater | 1,830 | 65 | 211 | 3,220 | 12 | 429 | 5,767 |
| Connate water | 59,491 | 19,040 | 2,439 | 132,060 | 354 | 350 | 213,734 |

The tests were conducted at 95° C. and 3100 psi pore pressure to simulate the reservoir conditions. The microspheres were purchased from Henan Zhengjia Green Energy Co., Ltd. of China, in the form of water in oil emulsion. A 5 mL aliquot of the emulsion was dispersed in 1000 mL of seawater, forming a suspension with a concentration of 0.5 wt. % microspheres. This provides an effective concentration of microspheres of 0.2% because the solid content of the emulsion is 0.4. After dispersion in seawater, the microsphere suspension was white and homogenous with a viscosity close to water. The particle size was 0.0755 μm in seawater, as tested using a laser diffraction particle size analyzer from Beckman, USA. The main properties are listed in Table 4.

The SmartWater was blended by dissolving 8.208 g NaCl, 0.4769 g $CaCl_2 \cdot 2H_2O$, 3.5290 g $MgCl_2 \cdot 6H_2O$, 1.2686 g $Na_2SO_4$, and 0.033 g $NaHCO_3$ in 2000 mL deionized water.

TABLE 4

Properties of microsphere sample

| Sample Name | Solid content, % | Density, $g/cm^3$ | Particle size, μm | Zeta potential, mV | Viscosity, mPa · s |
|---|---|---|---|---|---|
| Microsphere | 37.2 | 0.9806 | 0.0755 | −4.6 | 1.05 |

Example 1: A Single Sequential Injection of a Microsphere Suspension and SmartWater In this test, the core plug, which was saturated with connate water, was first flushed with the seawater. Connate water is the original irreversible brine in the reservoir. The ionic concentrations are listed in Table 3. The microsphere suspended in seawater was injected at flow rate of 0.5 mL/min for 1 PV, followed by SmartWater injection at same flow rate.

Figure 4:
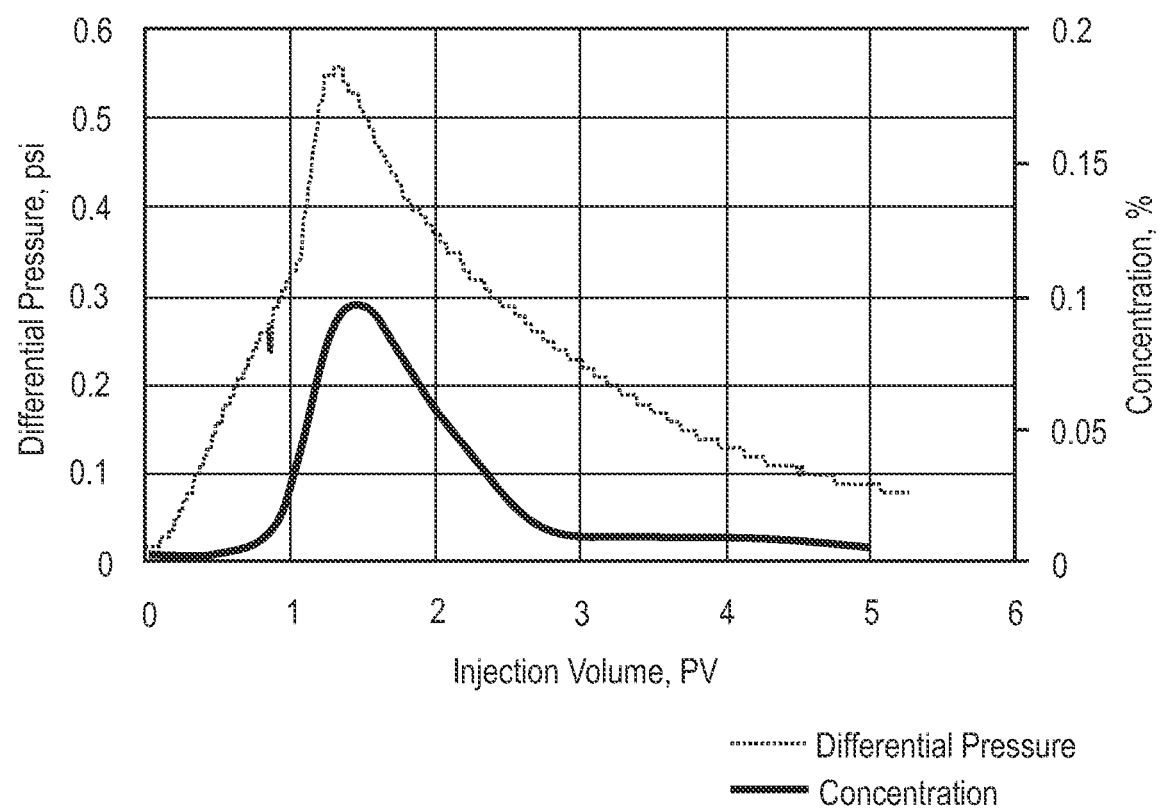
FIG. 4 is a plot of the differential pressure and effluent concentration in Example 1.

FIG. 4 is a plot of the differential pressure and effluent concentration in Example 1. As shown on FIG. 4, the differential pressure increased during the microsphere injection from 0.02 psi to a maximum value 0.33 psi. After switching to SmartWater injection, the differential pressure increased rapidly to 0.56 psi during the first 0.3 PV injection and then decreased slowly. The retention value was 0.453 mg/g-rock, indicating better injectivity in the core. This could divert the flow in the deep reservoir and increase the sweep efficiency of the chase injected SmartWater.

The effluent concentration increased during the microsphere injection and the beginning of SmartWater injection. After reaching a maximum value of 0.1 wt. %, the concentration decreased to almost zero after about 2 PV SmartWater injection. By material balance calculation, the retention value was 0.453 mg/g-rock. The additional pressure increase at the beginning of the SmartWater injection came from the swelling of microsphere after contacting with the SmartWater. After sufficient mixing, the SmartWater improved the suspension stability of the microsphere and promoted a long-lasting microsphere production from the outlet. In a real reservoir, this will favor the in-depth propagation and injectivity.

Example 2: Two Sequential Injections Alternating Between the Microsphere Suspension and SmartWater The injectivity of microsphere in the core can be further improved by the number of alternating injection runs. In this example, the alternating injections of the microsphere suspension and SmartWater were repeated. As listed in Table 1, 0.6 PV of microsphere in seawater followed by 0.2 PV of SmartWater was injected into to the brine saturated core plug in the first run. The second run injected 0.4 PV microsphere in seawater, followed by SmartWater injection.

Figure 5:
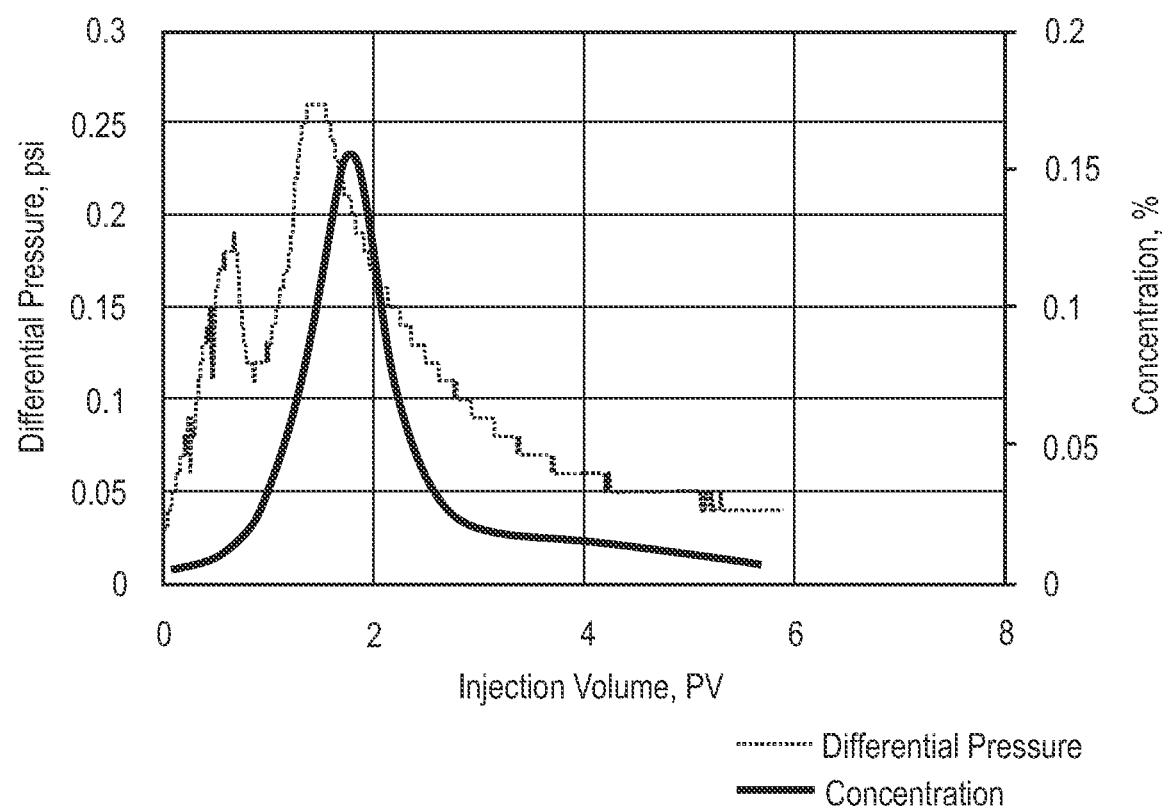
FIG. 5 is a plot of the differential pressure and effluent concentration in Example 2.

FIG. 5 is a plot of the differential pressure and effluent concentration in Example 2. In the first injection, 0.6 PV of the microsphere suspension was injected and the differential pressure increased from 0.02 psi to 0.17 psi. In a following injection of 0.2 PV SmartWater, the differential pressure first increased to 0.19 psi and then decreased to 0.12 psi. This indicates the SmartWater improved the suspension stability of the microsphere and helped the transport to the deep position.

Similarly, in the second sequential injection, during the injection of 0.4 PV of the microsphere suspension, the differential pressure first increased to 0.26 psi by the end of the microsphere injection and the beginning of the Smart-Water injection, and then decreased to 0.05 psi. The microsphere concentration in the effluent kept increasing until the last SmartWater injection. The maximum concentration was 0.16 wt. %, which was higher than the value in the above two examples. This confirmed the improvement of deep propagation by the SmartWater injection between the two microsphere slugs. By material balance calculation, the retention value was as low as 0.360 mg/g-rock, indicating much better injectivity than Example 1. The high blocking may cause plugging near the well bore. The alternative injection of two runs could improve the blocking by shifting the microspheres to pores deeper in the reservoir.

Example 3: Oil Recovery Performance of Alternating Injections of a Microsphere Suspension with SmartWater The microsphere and SmartWater alternative injection can effectively increase the oil production in the carbonate cores after the seawater flooding. Example 3 is an oil recovery test using 1 run of microsphere and SmartWater injection after water flooding.

The oil displacement test was conducted to evaluate the oil recovery potential of microsphere and SmartWater alternative injection. The core plugs were natural permeable carbonate as listed in Table 2. Two carbonate core plugs 27 and 98 were used together to form a longer carbonate composite. The microsphere concentration in the microsphere suspension was 0.5 wt. %. The tests started with seawater flooding at 0.5 mL/min. After the oil production and differential pressure stable, a bump waterflooding was conducted using flow rate of 1 mL/min and 2 mL/min. This was followed by a 1 PV injection of a microsphere suspension, followed by a 1 PV SmartWater injection.

Figure 6:
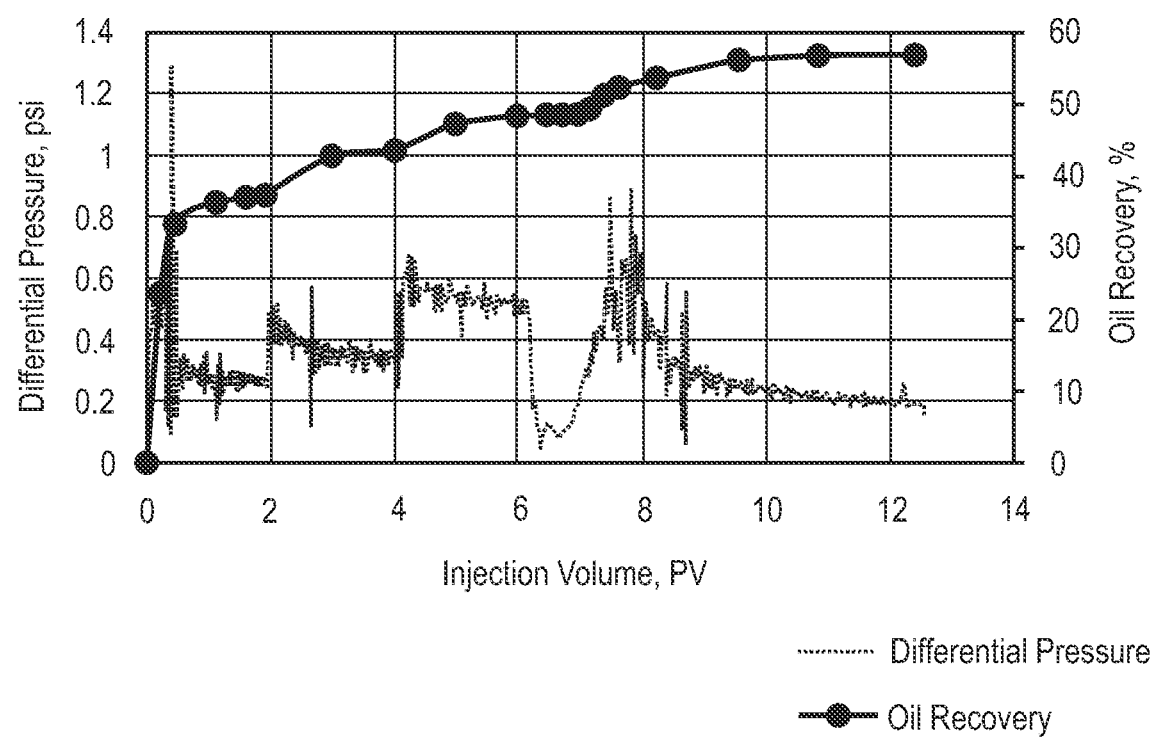
FIG. 6 is a plot of the differential pressure and oil recovery in Example 3.

FIG. 6 is a plot of the differential pressure and oil recovery in Example 3. Waterflooding of 0.5 mL/min with high salinity seawater recovered oil of 38.2 vol. %. The bump floods increased the oil production by 11.7 vol. %, indicating a severe end effect. Capillary end effect is the accumulation of the wetting phase (oil phase in this case) at the outlet end of the core plug due to the capillarity discontinuity.

In comparison, the microsphere injection increased the differential pressure from 0.09 psi to 0.45 psi. After around 0.9 PV injection, a small oil bank was observed at the produced port and the oil continued to be produced throughout the microsphere injection. The oil recovery was increased by 3.8 vol. % during the microsphere injection. The subsequent injection of SmartWater had a long lasting effect on oil production. The differential pressure first increased to 0.55 psi and then decreased slowly to 0.16 psi. After about 4.5 PV SmartWater injection, the oil recovery was increased by 4.5 vol. %. The total oil recovery by microsphere and SmartWater injection after a bump water flooding was 8.3 vol. %.

Embodiments

An embodiment described in examples herein provides a method for enhanced oil recovery in a reservoir. The method includes injecting a microsphere suspension, including polymeric microspheres dispersed in seawater, into an injection well in the reservoir and injecting a low salinity tailored water (SmartWater) into the injection well in the reservoir. Oil is produced from a production well in the reservoir.

In an aspect, the method includes injecting seawater into the injection well after the SmartWater.

In an aspect, a microsphere is a polyacrylamide-based preformed gel in an oil emulsion. In an aspect, a particle size of the microsphere is between about 10 nm to about 10 μm before swelling.

In an aspect, the method includes mixing an emulsion of the polymeric microspheres with the seawater. In an aspect, a concentration of the microspheres in the seawater is between 0.1 wt. % and 0.5 wt. %. In an aspect, a concentration of the microspheres in the seawater is between 0.1 wt. % and 0.3 wt. %. In an aspect, the salinity of the seawater is between about 35,000 ppm to about 56,700 ppm.

In an aspect, the reservoir includes a carbonate reservoir. In an aspect, the carbonate reservoir is a permeable matrix type carbonate reservoir.

In an aspect, the total dissolved solids (TDS) of the SmartWater is between about 4,000 ppm to about 8,000 ppm. In an aspect, the SmartWater includes sulfate ions at a concentration of between about 300 ppm to about 1000 ppm. In an aspect, the SmartWater includes divalent ions at a concentration of less than about 300 ppm.

In an aspect, the method includes injecting a slug of the microspheres in the seawater of between about 0.05 pore volume (PV) and about 1 PV. In an aspect, the method includes injecting a slug of the SmartWater in the seawater of between about 0.1 pore volume (PV) and about 1 PV.

In an aspect, the method includes performing iterations of injecting the microsphere suspension into an injection well in the reservoir and injecting a low salinity tailored water (SmartWater) into the injection well in the reservoir. In an aspect, the method includes performing two iterations.

Other implementations are also within the scope of the following claims.

What is claimed is:

1. A method for enhanced oil recovery in a reservoir, comprising:
  injecting a microsphere suspension, comprising polymeric microspheres dispersed in seawater, into an injection well in the reservoir, wherein the polymeric microspheres are between about 10 nm and about 100 nm;

injecting SmartWater into the injection well in the reservoir to swell the polymeric microspheres diverting flow of the SmartWater into unswept regions of the reservoir;

injecting saltwater into the injection well to shrink the polymeric microspheres and move the polymeric microspheres in the reservoir;

injecting a second slug of Smartwater into the injection well to swell the polymeric microspheres and diverting flow into another unswept region in the reservoir; and producing oil from a production well in the reservoir.

2. The method of claim 1, comprising injecting seawater into the injection well after the SmartWater.

3. The method of claim 1, wherein a microsphere is a polyacrylamide-based preformed gel in an oil emulsion.

4. The method of claim 3, wherein a particle size of the microsphere is between about 10 nm to about 10 μm before swelling.

5. The method of claim 1, comprising mixing an emulsion of the polymeric microspheres with the seawater.

6. The method of claim 5, wherein a concentration of the polymeric microspheres in the seawater is between 0.1 wt. % and 0.5 wt. %.

7. The method of claim 5, wherein a concentration of the polymeric microspheres in the seawater is between 0.1 wt. % and 0.3 wt. %.

8. The method of claim 5, wherein the seawater has a total dissolved solids of between about 35,000 ppm to about 56,700 ppm.

9. The method of claim 1, wherein the reservoir comprises a carbonate reservoir.

10. The method of claim 9, wherein the carbonate reservoir is a permeable matrix type carbonate reservoir.

11. The method of claim 1, wherein a total dissolved solids (TDS) of the SmartWater is between about 4,000 ppm to about 8,000 ppm.

12. The method of claim 1, wherein the SmartWater comprises sulfate ions at a concentration of between about 300 ppm to about 1000 ppm.

13. The method of claim 1, wherein the SmartWater comprises divalent ions at a concentration of less than about 300 ppm.

14. The method of claim 1, wherein the microsphere suspension is injected at a volume of between about 0.05 pore volume (PV) and about 1 PV of the reservoir.

15. The method of claim 1, wherein the SmartWater is injected at a volume of between about 0.1 pore volume (PV) and about 1 PV of the reservoir.

* * * * *